United States Patent [19]

Joubert

[11] 4,274,593
[45] Jun. 23, 1981

[54] MOVABLE BLAST PIPES FOR JET ENGINES

[75] Inventor: Raymond J. M. Joubert, Savigny sur Orge, France

[73] Assignee: Societe Nationale de'Etude et de Constr. de Moteurs d'Aviation, Victor, France

[21] Appl. No.: 79,434

[22] Filed: Sep. 27, 1979

[30] Foreign Application Priority Data

Sep. 27, 1978 [FR] France .................... 78 28167

[51] Int. Cl.³ .................................... B64C 15/04
[52] U.S. Cl. ........................................ 239/265.35
[58] Field of Search .............. 239/265.35, 265.19, 239/265.33, 265.37; 60/232, 230, 228; 244/12.4, 12.5; 285/272

[56] References Cited

U.S. PATENT DOCUMENTS

| 3,142,153 | 7/1964 | Hensley | 60/232 X |
| 3,837,578 | 9/1974 | Leibach | 239/265.35 |
| 3,989,193 | 11/1976 | Vedova et al. | 239/265.35 |
| 4,000,854 | 1/1977 | Konarski | 239/265.35 |

FOREIGN PATENT DOCUMENTS

937270  9/1963  United Kingdom ............... 239/265.35

Primary Examiner—Robert B. Reeves
Assistant Examiner—Gene A. Church
Attorney, Agent, or Firm—Oblon, Fisher, Spivak, McClelland & Maier

[57] ABSTRACT

An improvement in movable blast pipes for jet engines, including a fixed element joined to the engine, at the end of which fluid is ejected into a movable element pivotably mounted at the rear of the fixed element following an axis perpendicular to the longitudinal axis of said fixed element. On each side of the pivoting axis are arranged two pairs of guidance, two-way screw jacks whose bodies are mounted and joined to the movable element and include a sliding shaft joined with the middle portion of levers in turn joined at one of their ends to the movable element upstream from the junction point of the screw jacks, with the other end of the levers being joined to one end of rods whose other ends, in turn, are joined with the fixed element.

8 Claims, 10 Drawing Figures

FIG. 10 the
MOVABLE BLAST PIPES FOR JET ENGINES

BACKGROUND OF THE INVENTION

1. Field of the Invention

The present invention is directed to an improvement in movable blast pipes for jet engines.

2. Description of the Prior Art

To respond to the new requirements of users concerning the maneuverability of certain planes and the necessity to carry out rapid changes in plane attitude, without calling on classical guiding devices which in general have the drawback of increasing the drag on the plane, at a time when required performance demands maximum smoothness of the body, it has been desirable to equip jet engines with movable blast pipes.

These movable blast pipes include a stationary element composed notably of the back part of the post-combustion canal of the engine, at the end of which the gas is ejected into a movable element, mounted and pivoting at the end of the fixed element according to an axis perpendicular to the longitudinal axis of said fixed element, said elements being mounted in a watertight and airtight manner, one with relation to the other, by means of spherical collars.

SUMMARY OF THE INVENTION

The present invention has as its aim an improvement in the command of these movable blast pipes, in which the screw jacks with two-way guidance capabilities are mounted on the movable element according to a "push-pull" arrangement.

In conformity with the present invention, on each side of the pivot axis are arranged two pairs of screw jacks with two-way directional capabilities, the bodies of each of which are mounted so as to be joined to the movable element and the sliding shaft of each of which is joined with the middle portion of a lever joined at one end thereof to the movable element upstream from the junction point of the screw jack and the other end of the lever being joined to one end of a rod, the other end of such rod being joined to the fixed element.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
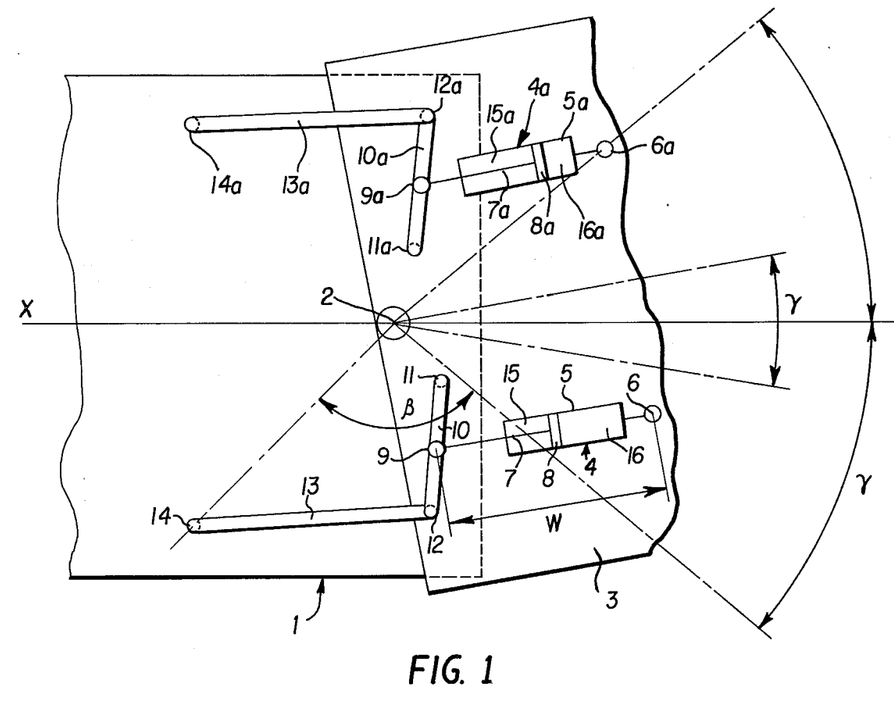
FIG. 1 is a schematic view of a movable blast pipe, improved according to the present invention.

In FIG. 1, is shown a movable blast pipe which includes a fixed element, 1, composed notably of the rear part of the post-combustion canal of the engine and on which is mounted, pivoting around an axis of an axle or pivot member 2 perpendicular to the longitudinal axis, $XX_1$ of the fixed element, a movable element, 3, capable of pivoting following an angle y in relation to the axis $XX_1$ of the fixed element, 1, and of thereby changing the direction of the gas ejected from the movable element, 3. On each side of the pivot axis, 2, are arranged two pairs of screw jacks, 4, 4a with two-way operational or directional effect (a single screw jack per pair being shown in FIG. 1), whose bodies, 5, 5a are joined around an axis of an axle or pivot member, 6, 6a on the movable element, 3, and whose shaft, 7, 7a of a piston, 8, 8a is joined around an axis of an axle or pivot member, 9, 9a on the middle portion of a lever, 10, 10a, joined at one of its ends around an axis of an axle or pivot member, 11, 11a, situated upstream from the pivot member 6, 6a, on the movable element, 3. At its other end, the lever, 10, 10a, is joined around an axis of an axle or pivot member, 12, 12a at one of the ends of a rod, 13, 13a, joined at its other end around an axis of an axle or pivot member, 14, 14a on the fixed element, 1.

In order to shift the movable element, 3, being in the limiting position shown in FIG. 1, to another position, one must simply supply the compartment, 15, of the screw jack, 4 with fluid so that the action on the piston, 8, entails movement of the pivot, 9, which is unitary with the head of the shaft, 7, of the screw jack and of the lever, 10. There results a contraction of the distance, W, between the pivots, 9 and 6, which has the effect of causing rotation of the pivot 6 around pivot 2 and thus of increasing the angle α while simultaneously producing rotation of the pivot 12 by the same angle around pivot 2, the rod, 13, transmitting the movement to pivot 12.

The movement of pivot 12 causes rotation of the rod, 13, around pivot 14, so that the angle formed by the pivots 14, 2, 6, decreases equally in value.

The motion of the two pairs of screw jacks, 4, 4a situated on each side of pivot 2 has the same value and the supply of hydraulic fluid under pressure of the pairs of screw jacks, 4 and 4a, is crossed or opposite so that the chambers, 15 and 16a or 16 and 15a are supplied simultaneously so as to obtain coordinated action of the screw jacks.

Figure 2:
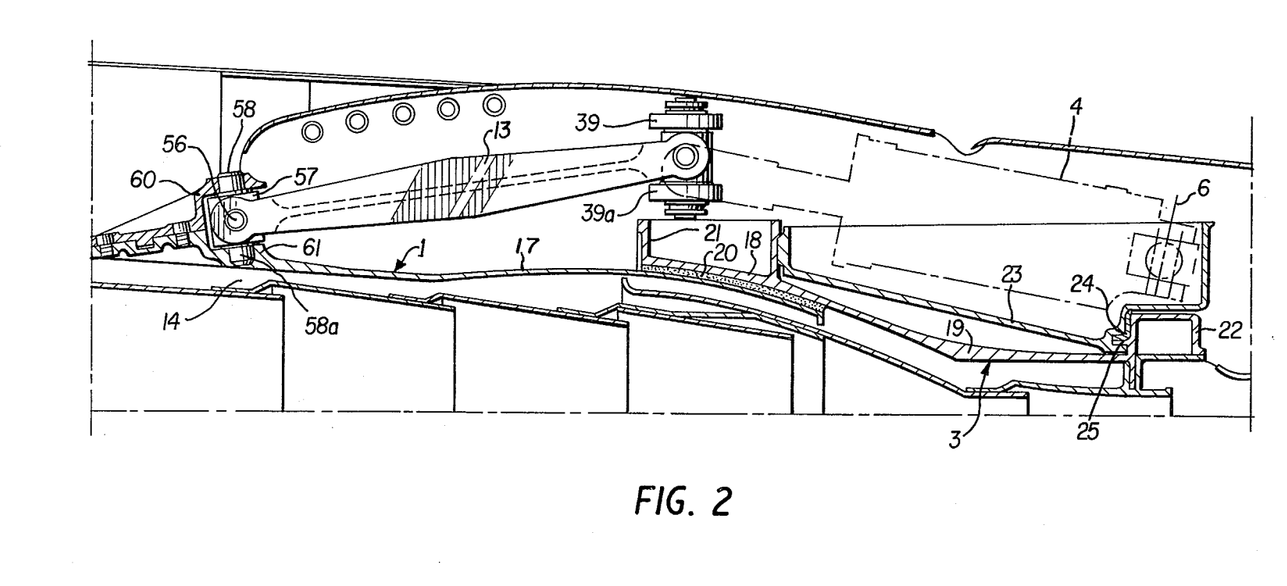
FIG. 2 is a longitudinal cutaway view, partial, of an embodiment implementing the present invention of the movable blast pipe and means for guiding the movable element.

In FIG. 2 is shown a way of carrying out implementation of the movable blast pipe according to the invention, in which the fixed element, 1, of the blast pipe has at its rear end a spherical collar, 17, against which may be moved a corresponding spherical collar, 18, of a ferrule, 19, constituting the movable element, 3, of the blast pipe, with the spherical collar, 17, having a radius slightly less than that of the spherical collar, 18. The watertight and airtight connection between the spherical collars of the elements, 1 and 3, is accomplished by means of a honeycomb covering, 20. This is a structure of fine, hard-soldered honeycomb type material, soldered on the spherical collars, 17 or 18. This covering could also consist of a composite material with a graphite base. The movable element, 3, comprises a spherical ferrule, 19, on which are set stiffening pieces composed of two annular bodies, in profile, 21, 22, which are joined by units, 23, in which are set the screw jacks, 4, 4a. On the upstream body, 21, are set the junction pivots, 2 and 11, and the downstream body, 22, constitutes an anchorage point, 6, for the screw jacks, 4, 4a.

Figure 7:
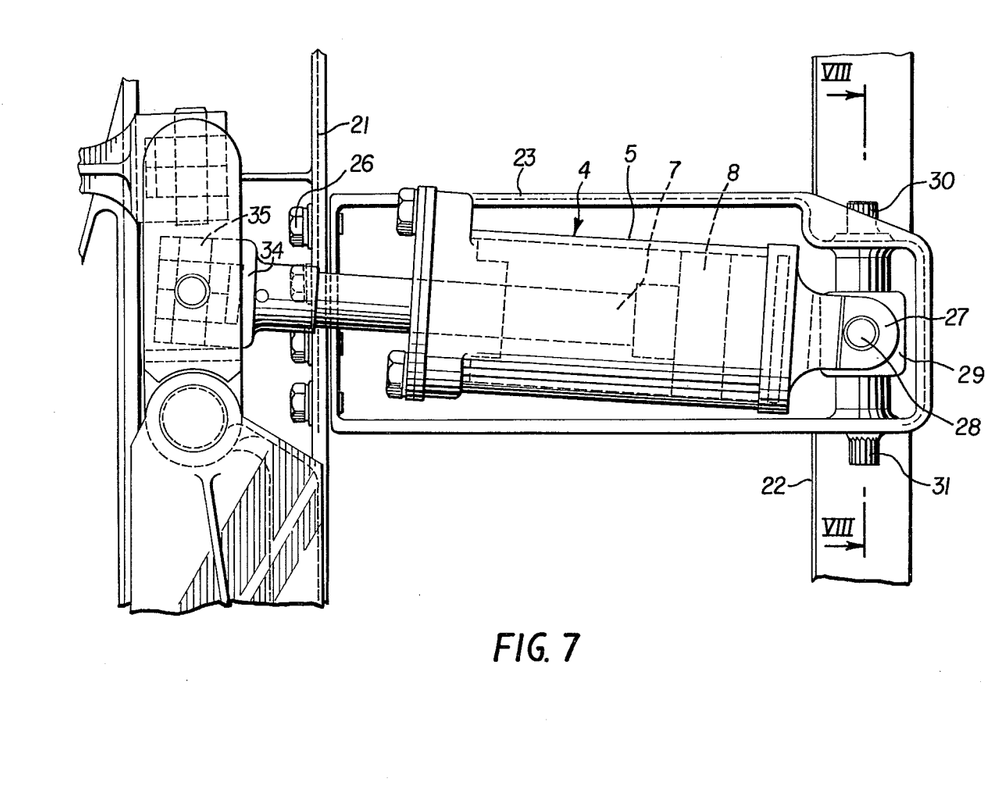
FIG. 7 is an elevation view of one of the screw jacks.
Figure 8:
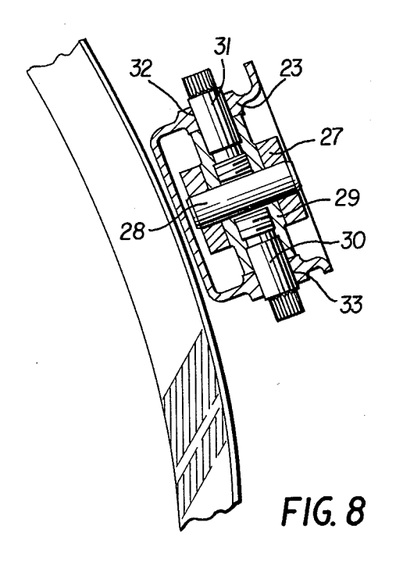
FIG. 8 is a cutaway view taken along line VIII—VIII of FIG. 7.

In FIGS. 2, 7, and 8, are shown the mounting of one of the screw jacks, 4, in a unit, 23, having at one end a groove, 24, in which is set a rib, 25, of the annular body, 22, and at its other end threaded holes in which are set the screws, 26, for the setting of the annular body, 21.

At one end of the body, 5, of the screw jack, 4, is a cover, 27, for its junction around pivot, 6, in which is set a pivot, 28, unitary with a crosspiece, 29, having a threaded hole in which screwed pins, 30, 31, are set in holes, 32, 33, of the unit, 23.

Figure 3:
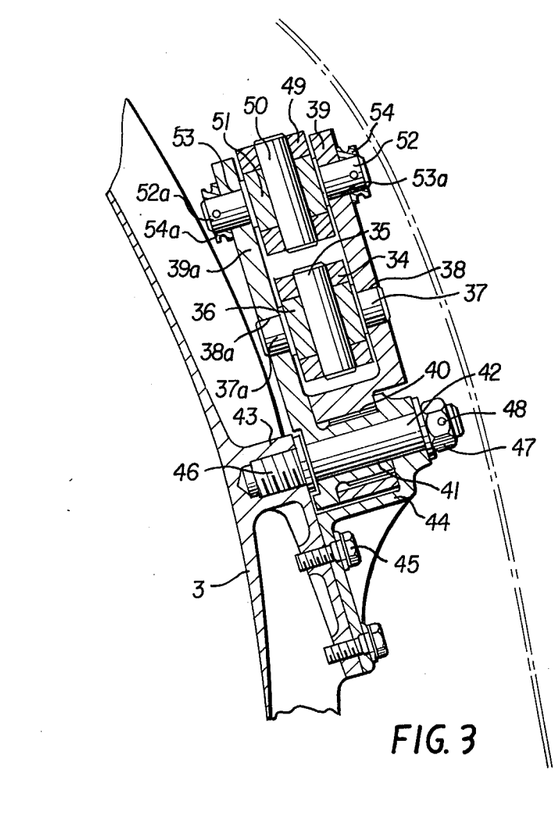
FIG. 3 is a cutaway view of the lever having three points taken along line III—III of FIG. 4.
Figure 4:
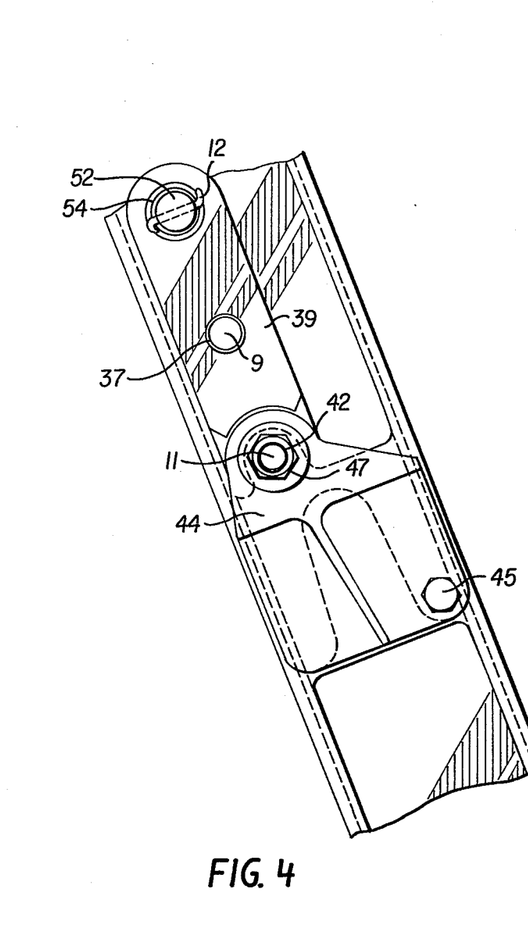
FIG. 4 is a lateral view from the right hand side of FIG. 3.

At the end of the shaft, 7, of the piston, 8, of the screw jack, is provided a cover, 34, which is joined following the pivot, 9 (FIGS. 3, 4, and 7) around a pivot, 35, unitary with a crosspiece, 36, whose pins, 37, 37a are pivotably mounted in holes, 38, 38a of the two parts or wings, 39, 39a (FIGS. 3 and 4) constituting the lever 10, which, in turn, are linked at one of their ends by a channeled part, 40. The extremity of the part 40 is provided with a hole, 41, in which is set a dowel, 42, mounted in a cover composed of a swelling, 43, in the movable element, 3, and abuts a square branch, 44, fixed by means of a screw, 45, on said movable element, 3. The pin, 42, is screwed by a threaded part, 46, in the swelling, 43, and has at its other end a threaded part on which is screwed a screw nut, 47, blocked by a pin, 48.

Figure 5:
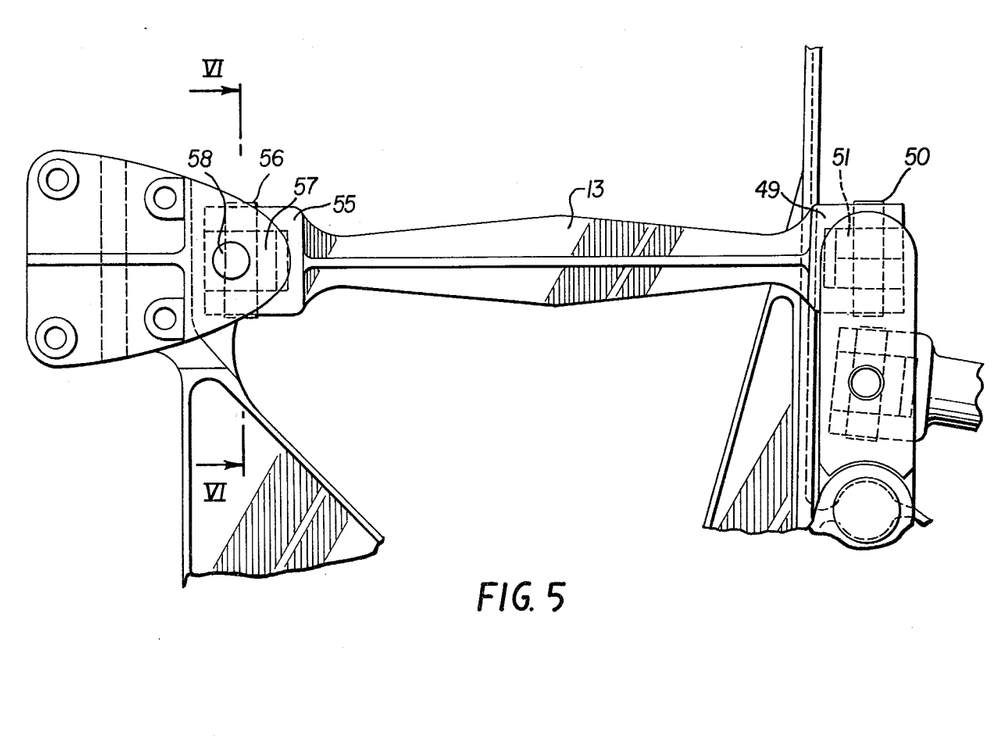
FIG. 5 is an elevation view of the command lever, linked to the fixed element.
Figure 6:
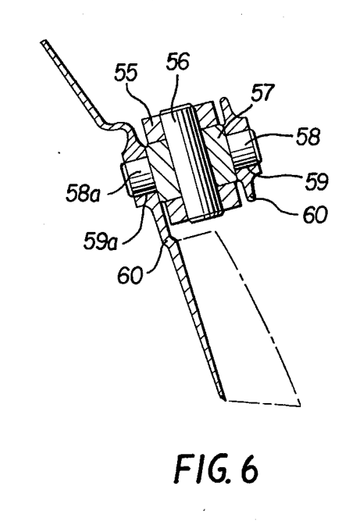
FIG. 6 is a cutaway view taken along line VI—VI of FIG. 5.

At the end of the lever, 10, corresponding to the pivot junction, 12, is mounted one of the ends of the unit, 13 (FIGS. 2, 3, 4 and 5) which has a cover, 49, joined around a pivot, 50, of one piece with a crosspiece, 51, whose pivots, 52, 52a are engaged in holes, 53, 53a, of parts or wings, 39, 39a, of the lever, 10, with said pivots being positioned by braking discs, 54, 54a, braked by pins. At its other end, the unit, 13, is joined around the pivot, 14, by means of a cover, 55, in which is engaged a pivot, 56 (FIGS. 2, 5, 6) of one piece with a crosspiece, 57, whose pivots, 58, 58a are engaged in holes, 59, 59a, of a cover, 60, in two parts, further mounted on a swelling, 61, of the fixed element, 1.

Figure 9:
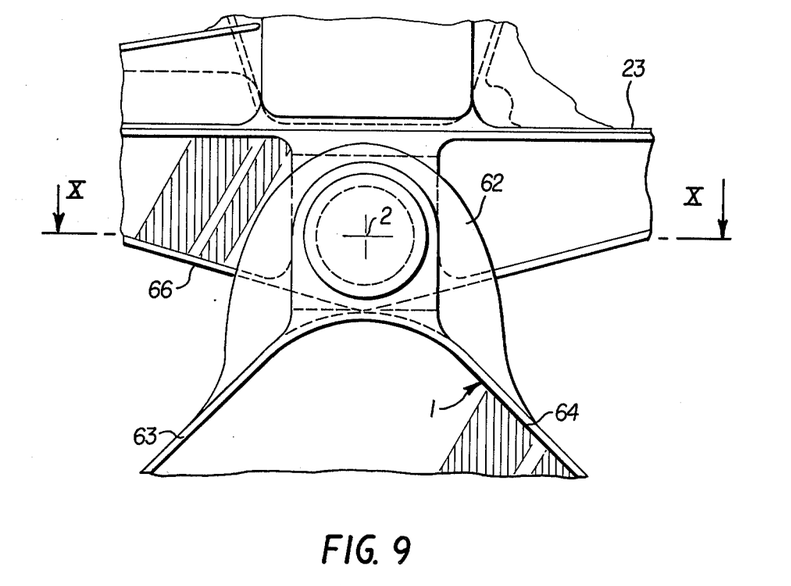
FIG. 9 is a lateral elevation view of the pivoting point of the movable element on the fixed element of the blast pipe.
Figure 10:
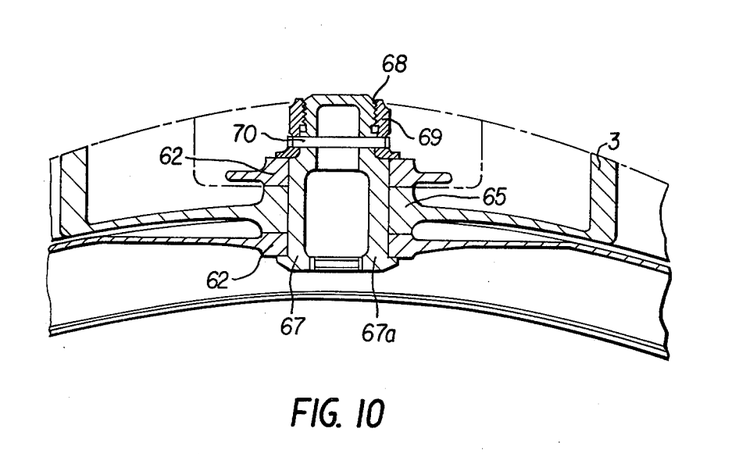
FIG. 10 is a cutaway view taken along line X—X of FIG. 9.

In FIGS. 9 and 10 are represented the pivoting member, 2, of the movable element, 3, on the fixed element, 1, and which includes a cover, 62, unitary with the fixed element, 1, having a ribbed part, 63, 64, said cover receiving between its branches an eye, 65, solid with the movable element, 3, and linked to the annular body, 21, of said element by a ribbed part, 66.

In the holes of the cover, 62, and of the eye, 65, is disposed a hollow axle, 67, carrying on one side a shoulder, 67a in support against one of the branches of the cover, 62, and on the other side a threaded part, 68, on which is screwed a threaded collar, 69, as support against the other branch of the cover, 62, said collar being locked by a pin, 70.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A movable blast pipe for a jet engine comprising:
    a fixed element joined to the engine;
    a movable element into which fluid is ejected from the fixed element, pivotably mounted at the rear of the fixed element along a pivoting axis perpendicular to the longitudinal axis of said fixed element;
    means for the watertight and airtight mounting of said fixed and movable elements, one with relation to the other, comprising cooperating spherical elements;
    two pairs of screw jacks for two-way guidance positioned on each side of said pivoting axis, each of said screw jacks including a body mounted and joined to the movable element and a sliding shaft; and
    lever means comprising a first lever and a second interconnected lever, the first lever being connected to said fixed element and said second lever being joined at one end to the movable element at a junction point upstream from the screw jack and at the other end to said first lever wherein said sliding shaft is joined to a middle portion of said second lever.

2. The movable blast pipe as set forth in claim 1, said two pairs of screw jacks having strokes of the same length and further comprising means for increasing the supply of fluid to the screw jacks for coordinated action of the screw jacks.

3. The movable blast pipe as set forth in claim 1, comprising:
    a plurality of units within which the screw jacks are positioned;
    a spherical ferrule operatively associated with said units;
    two annular stiffening bodies which are connected by the units at an upstream and downstream position, the upstream annular body including means for fixing the pivoting axis of the movable element on the fixed element and the junction point of the lever on the movable element and the downstream annular body including means for fixing the bodies of the screw jacks to the movable element.

4. The movable blast pipe as set forth in claim 3, further comprising a watertight and airtight honeycomb covering fixed on one of the fixed and movable elements.

5. A movable blast pipe as set forth in claim 3, further comprising a watertight and airtight covering composed of a composite covering with a graphite base set on one of the fixed and movable elements.

6. A movable blast pipe as set forth in claim 1 or 3 further comprising:
    means for pivoting the movable element on the fixed element which includes;
    a cover formed from said fixed element having a ribbed part and first and second branches;
    said movable element having an eye portion and a ribbed part connecting said eye portion to said upstream annular body;
    an axle member having a hollow portion formed therein and including a shoulder portion formed thereon and a threaded portion;
    said cover and said eye portion operatively engaging said axle, a first branch of said cover abutting said shoulder portion of said axle member; and further comprising a threaded collar engaging said threaded portion of said axle member for supporting said second branch of said collar.

7. A movable blast pipe as set forth in claims 1 or 3 further comprising:
 a cover positioned at one end of said sliding shaft;
 a cross piece connected to said cover;
 a wing member connected to said cross piece;
 a swelling member connected to said movable member; and
 a square branch member interconnecting said swelling member and said wing member.

8. The movable blast pipe as set forth in claim 1, said crosspiece including a threaded hole and further comprising a a pivot member disposed within said threaded hole and connected to said sliding shaft.